April 27, 1954
G. F. HOLMES
2,676,381
GRIP FOR TESTING MACHINES
Filed Aug. 20, 1951
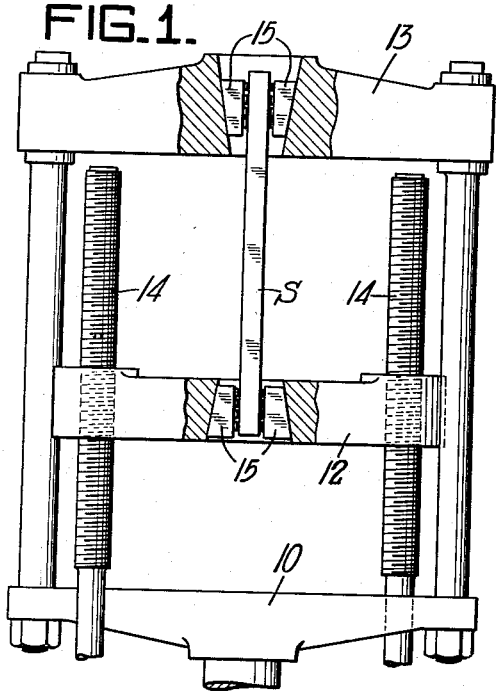
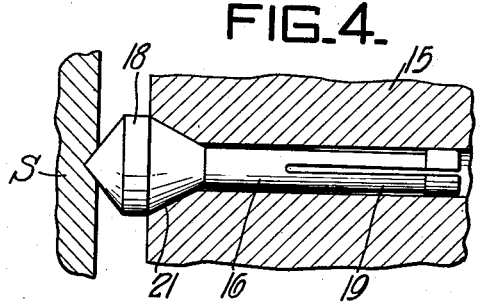
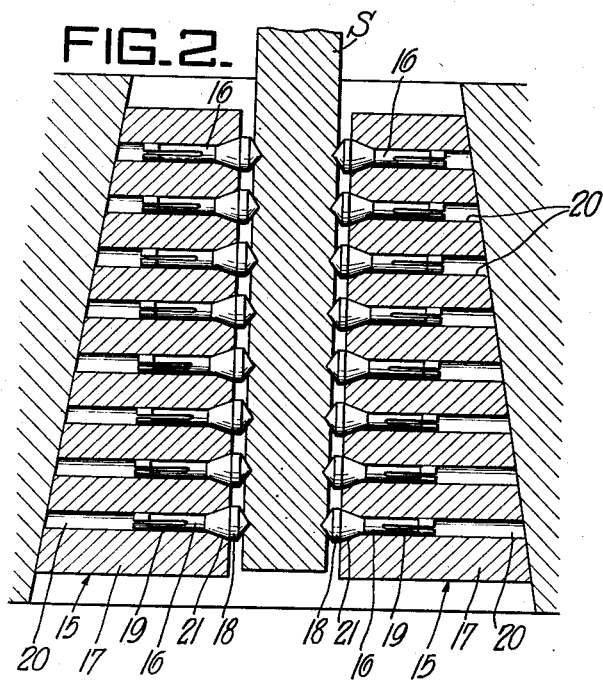
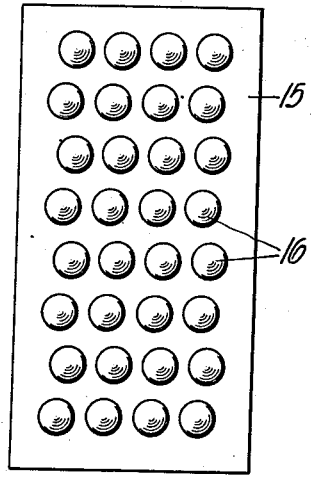
INVENTOR:
GORDON F. HOLMES,
BY: Donald G. Dalton
his Attorney.

Patented Apr. 27, 1954

2,676,381

UNITED STATES PATENT OFFICE 2,676,381

GRIP FOR TESTING MACHINES

Gordon F. Holmes, Fairfield, Ala., assignor to United States Steel Corporation, a corporation of New Jersey Application August 20, 1951, Serial No. 242,726

1 Claim. (Cl. 24—263)

This invention relates to improved grips for holding test specimens in a tensile testing machine.

An object of the invention is to provide improved grips which penetrate the surface of a test specimen and thus positively prevent slippage.

A further object is to provide improved grips which are formed of a large number of sharpened pins and wedges mounting these pins, whereby the pins readily can be removed, as for resharpening.

In accomplishing these and other objects of the invention, I have provided improved details of structure, a preferred form of which is shown in the accompanying drawing, in which:

Figure 1 is a side elevational view of a portion of a tensile testing machine equipped with grips which embody features of the present invention;

Figure 2 is a vertical sectional view on a larger scale showing the grips engaging a specimen;

Figure 3 is a front elevational view of one of the grips; and

Figure 4 is a vertical sectional view on a still larger scale showing one of the sharpened pins in place in the wedge.

Figure 1 shows a tensile testing machine which comprises a frame 10, lower and upper crossheads 12 and 13 and screws 14. Grips 15 are mounted in each crosshead and are adapted to attach a test specimen S to the two cross heads. The screws 14 can be rotated by suitable drive means, not shown, for moving one of the crossheads (in this instance the lower crosshead) away from the other and thus tensioning the specimen. The other crosshead (in this instance the upper crosshead) is connected to a weighing mechanism, not shown, which registers the force applied to the specimen. Apart from the grips, the machine can be of any standard or desired construction and therefore is not shown nor described in greater detail.

In accordance with the present invention, each of the grips 15 includes a plurality of pins 16 and a wedge 17 removably mounting these pins. Each pin is formed with an enlarged head 18 and a split shank 19. The pinheads 18 terminate in cone-shaped points. The wedge 17 has transverse openings 20 which receive the shanks of said pins and the points project from these openings. The outer ends of these openings flare outwardly, as indicated at 21, to receive the enlarged portions of the pinheads. The pins are readily removable from the wedge, but the springiness of the split shanks 19 normally retains them in place.

When the test machine tensions a specimen, the grips squeeze the ends of the specimen with a large mechanical advantage according to the familiar principles of wedge action. The cone-shaped points on the pinheads penetrate the surfaces of the specimen, as shown somewhat exaggerated in Figure 2. Thus there is no reliance on frictional forces for holding the specimen, and no possibility of slippage. Any such slippage would give an indication on the test machine similar to that of a yield point in the specimen. The pins can grip specimens satisfactorily even after their points become quite dull. Nevertheless it is a simple procedure to remove them from the wedges and resharpen them. Other advantages of the pins are that they grab a specimen immediately at the start of a test and that they never become caked with scale shed from the specimen.

While I have shown and described only a single embodiment of the invention, it is apparent that modifications may arise. Therefore, I do not wish to be limited to the disclosure set forth but only by the scope of the appended claim.

I claim:

A grip for a tensile testing machine comprising a wedge having a vertical front face and an inclined back face and containing a plurality of transverse cylindrical passages which extend from said front face to said back face and flare outwardly adjacent said front face, and a plurality of pins, each of which includes a split cylindrical shank received in a different one of said passages and retained therein by its own spring action, a frusto-conical portion received in the flared portion of a passage, which portion provides a thrust-bearing surface, and an enlarged pointed head protruding from said front face.

References Cited in the file of this patent

UNITED STATES PATENTS

| Number | Name | Date |
|---|---|---|
| 474,719 | Brande | May 10, 1892 |
| 1,107,177 | Noble | Aug. 11, 1914 |
| 1,371,933 | Rebman | Mar. 15, 1921 |
| 1,780,785 | Jannson | Nov. 4, 1930 |
| 1,885,855 | Moran | Nov. 1, 1932 |
| 2,030,499 | Church | Feb. 11, 1936 |
| 2,119,731 | Abegg | June 7, 1938 |
| 2,419,711 | Dillon | Apr. 29, 1947 |
| 2,447,660 | Miklowitz | Aug. 24, 1948 |